S. A. DOBYNE.
STARTING AND STOPPING MECHANISM.
APPLICATION FILED SEPT. 4, 1917.

1,436,019.

Patented Nov. 21, 1922.
2 SHEETS—SHEET 1.

Inventor:
STEPHEN A. DOBYNE,
By John N. Breninger
His Attorney.

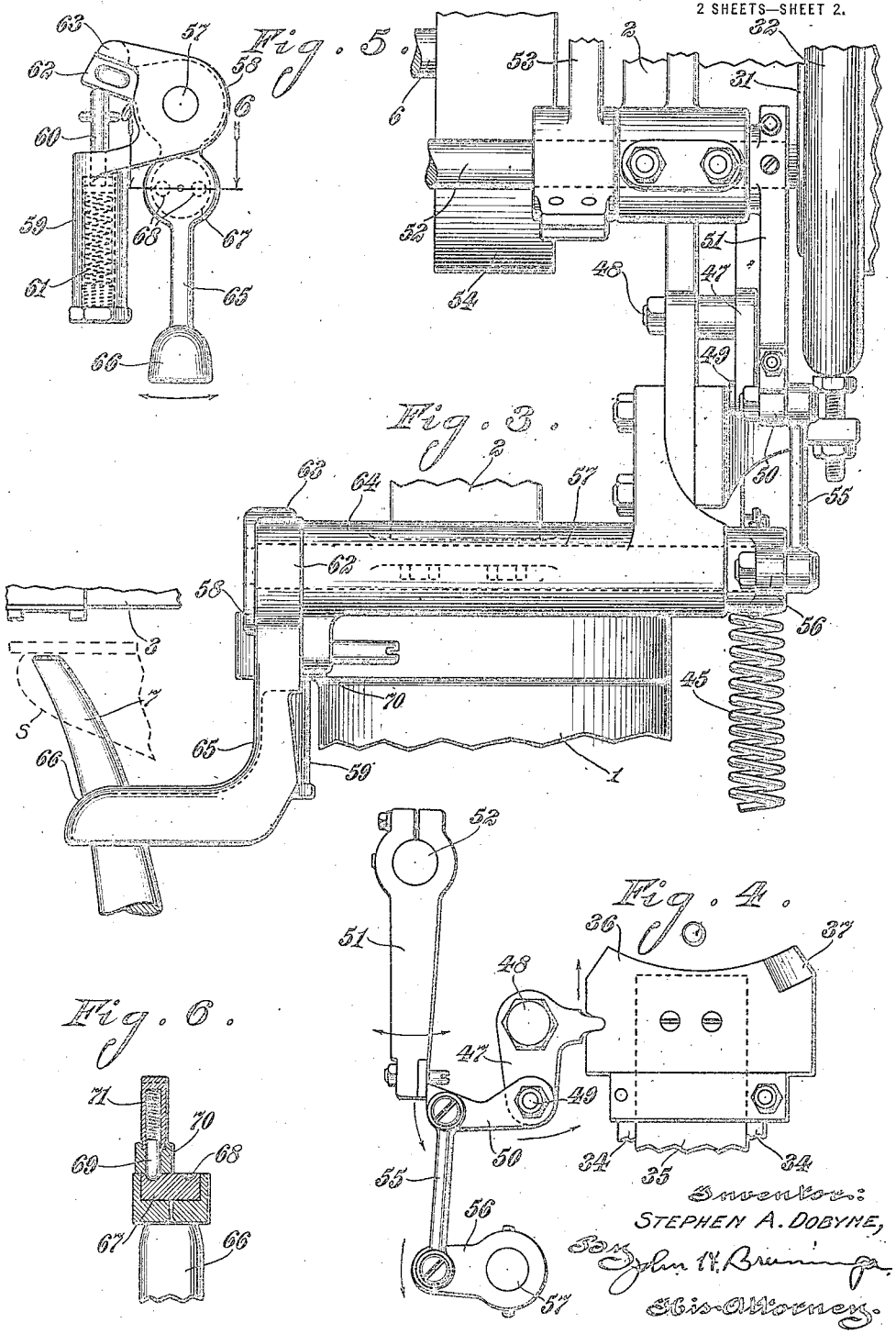

Patented Nov. 21, 1922.

1,436,019

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

STARTING AND STOPPING MECHANISM.

Original application filed March 6, 1917, Serial No. 152,843. Divided and this application filed September 4, 1917. Serial No. 189,689.

*To all whom it may concern:*

Be it known that I, STEPHEN A. DOBYNE, a citizen of the United States, and residing at St. Louis, Missouri, have invented the new and useful Improvement in Starting and Stopping Mechanism, of which the following is a specification.

This invention relates to starting and stopping mechanism, and more particularly to mechanism designed for fastener inserting machines. This application is a division of my application Serial No. 152,843 filed March 6, 1917, which has matured into Patent No. 1,363,180 December 21, 1920.

One of the objects of this invention is to provide starting and stopping mechanism in which the actuator is so constructed and arranged as to permit convenient operation thereof by the operator.

Another object is to provide starting and stopping mechanism which is constructed for operation with a minimum of effort on the part of the operator.

Another object of this invention is to provide clutch shifting mechanism which is simple in construction and operation, and effective and reliable in its action.

Further objects will appear from the detail description taken in connection with the accompanying drawings, in which:

Figure 3 is an enlarged detail side elevation;

Figure 4 is a detail end elevation of Figure 3;

Figure 5 is another detail end elevation of Figure 3; and,

Figure 6 is a section on the line 6—6, Figure 5.

Referring to the accompanying drawings, 1 designates a machine column, which has mounted thereon a machine head 2, carrying the mechanism to be started, which in this case is fastener inserting mechanism. The presser-foot of this mechanism is shown at 3, and the horn or work support for the shoe S, is shown at 7. The machine head carries a main drive shaft 6, which operates the fastener inserting mechanism, and which is started and stopped by the mechanism as hereinafter described.

Figure 1:
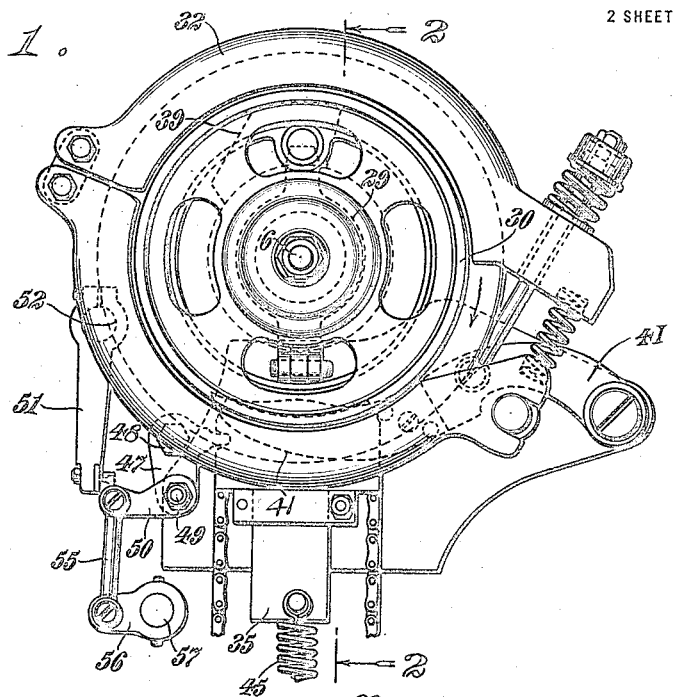
Figure 1 is an end elevation of starting and stopping mechanism embodying this invention.
Figure 2:
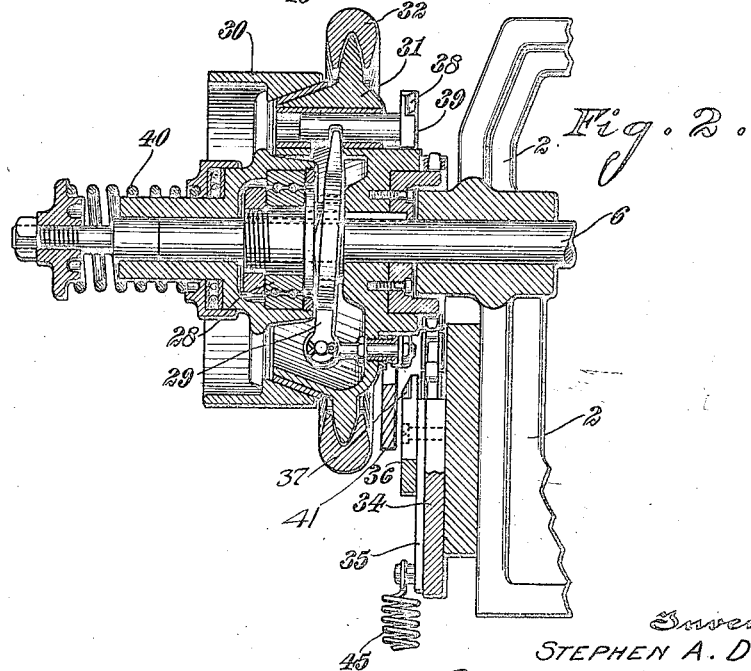
Figure 2 is a section on the line 2—2, Figure 1.

Mounted on the main drive shaft is a clutch and brake mechanism. This clutch and brake mechanism is shown and described in my Patent No. 1,352,585, patented September 14, 1920. This mechanism comprises generally, a belt pulley 30, loosely mounted on the main drive shaft 6, for endwise movement thereon, and cooperating with a cone face on a cooperating clutch member 31 fixed to the main drive shaft. The brake band 32 also cooperates with a cooperating brake surface fixed to the main drive shaft. Sliding in a bearing 34 on the machine head is a shank 35, which carries a shifter 36. This shifter has a bevel face 37, adapted to cooperate with a corresponding bevel face 38 on a block 39 carried by the clutch member 36. This block 39 slides axially in the fixed clutch member 31, and is connected with one end of a lever 29, pivoted at its other end to the fixed clutch member, and bearing at its center against a ball thrust bearing 28 in the pulley 30. The block 39 is, therefore, by its axial movement, connected and adapted to slide the loose pulley 30 out of engagement with the fixed clutch member 31, the pulley being returned into engagement by a spring 40. The block 39 is also adapted to engage a lever 41, adapted to clamp the brake band on the brake surface, and thus brake the drive shaft. When the shifter 36 is in the position shown in Figures 1 and 2, the bevel face 37 will be in the path of the bevel face 38, so that rotation of the fixed clutch member 31, and the block 39 therewith, will cause engagement of the bevel faces, so as to disengage the clutch, and further movement of the block 39 will, by its engagement with the arm or lever 41, apply the brake, so as to stop the drive shaft. When, however, the shifter 36 is depressed, it will move out of engagement with the block 39, and will thus release this block, thereby permitting the spring 40 to engage the clutch and again start the machine. This mechanism is fully described in Patent No. 1,352,585 referred to.

The shifter 36 is depressed by a strong spring 45 attached at its lower end to a pin on the machine head. A bell-crank lever 47 is pivoted at 48 on the machine head, and has one arm entering a recess in the shifter, while the other arm has pivoted thereto at 49, a toe 50, adapted to be engaged by an actuator arm 51, fixed to a rock-shaft 52 in the machine head, and rocked by an arm 53 from a cam wheel 54 on the main drive shaft. When the parts are in the position shown in Figures 1 and 2, the actuator 51 will have moved the toe to the right, so as to raise the shifter against its spring 45, into the path of the block 39, so as to shift the clutch and apply the brake to stop the machine. When, however, the toe 50 is moved downwardly out of the path of the end of the actuator 51, and out of engagement therewith, then the spring 45 will drop the shifter 36, and start the machine. When, however, the toe 50 is again raised, the actuator will again move it to the right, Figure 1, and stop the machine, the shifter being now locked in position by the actuator.

A link 55 connects the free end of the toe 50 with an arm 56 on a rock-shaft 57 mounted in a bearing 64 on the machine head. This rock-shaft 57 has fixed thereto, a head 58 provided with a barrel 59, in which is mounted a plunger 60, pushed outwardly by a spring 61. This plunger bears against a lug 62 loosely mounted on the rock-shaft 57, and holds it against a lug 63 on the head 58. The lug 62 has integral therewith, or fixed thereto, an arm 65 having a lateral hand piece 66 projecting, as shown in Figure 3, contiguous to, but forwardly of the horn 7. The arm 65 is provided with a hardened plate 67 provided with depressions 68, adapted to receive a plunger 69 mounted in a lug 70 on the bearing 64, and under the influence of a spring 71.

If the arm 65 is moved to the left, Figure 5, it will act, through the positive engagement of the lug 62 thereon, with the lug 63 fixed to the rock-shaft 57, to move the toe 50 downwardly and out of engagement with the actuator 51, thereby permitting the spring 45 to drop the shifter 36, so as to permit engagement of the clutch to start the machine. In practice, the arm 65 is pushed forwardly until the plunger 69 drops into its corresponding recess 68, thereby acting to lock the manual member in position. When the manual member 66 is moved to the right, Figure 5, it will, by the engagement of the lug 62 with a plunger 60, return the rock-shaft 57, so as to raise the toe 50 into the path of the actuator 51 (which is vibrated once for each revolution of the drive shaft), thereby causing the shifter 36 to be raised to stop the machine as heretofore described. If the manual member 66 should be returned to stop the machine, while the end of the actuator 51 is directly above the toe 50, then the upper face of the toe will engage the end of the actuator, the spring 61 permitting yield of the plunger, so as to permit full movement of the manual member 66 until the plunger 69 drops into its corresponding recess 68, and the spring 61 being now placed under tension, will cause the toe 50 to snap past the end of the actuator 51, as soon as this actuator end clears the toe, thereby permitting the toe to move into the path of the end of the actuator as it returns. The final operation or coupling of the actuator with the shifting member of the clutch is, therefore, insured, irrespective of the position of the actuator.

Referring now to Figure 3, it will be seen that the manual shifting member 66 is so constructed and arranged with respect to the horn, that the natural movements of the operator's hand in placing a shoe on and removing it from the horn, can be utilized to shift this member to start and stop the machine. Moreover, in view of the fact that the clutch is engaged and disengaged by mechanism operated from the drive shaft, the force required to be exerted by the operator is simply a tripping force, so that the operator will not be fatigued.

It is obvious that various changes may be made in the details without departing from the spirit of this invention. It is, therefore, to be understood that this invention is not to be limited to the specific construction shown and described.

Having thus described the invention, what is claimed is:

1. In starting and stopping mechanism for a machine having mechanism adapted to operate on the work, and a drive shaft connected to operate said mechanism, a clutch for said drive shaft, controlling mechanism for said clutch, including a manual member constructed and arranged to be shifted by the hand of the operator holding and when moving the work, and connected so as to start the machine when the work is placed in position, and so as to stop the machine when the work is to be removed, and means for retaining said controlling mechanism in either of its shifted positions.

2. In starting and stopping mechanism for a machine having mechanism adapted to operate on the work, and a drive shaft connected to operate said mechanism, a clutch for said drive shaft, mechanism for actuating said clutch, mechanism for controlling the operation of said actuating mechanism, including a manual member constructed and arranged to be shifted by the hand of the operator holding and when moving the work, and connected so as to render said actuating mechanism operative to engage said clutch and start the machine when the work is placed in position, and so as to render said actuating mechanism operative to disengage said clutch to stop the machine when the work is to be removed, and means for retaining said controlling mechanism in either of its shifted positions.

3. In starting and stopping mechanism for a machine having a drive shaft, a clutch for said drive shaft, means for shifting said clutch, an operating connection to said shifting means, an actuator adapted to engage said connection to disengage said clutch and lock the same in disengaged position, and manually controlled means adapted to be moved by the hand of the operator holding the work to move said connection into and out of the path of said actuator.

4. In starting and stopping mechanism for a machine having a drive shaft, a clutch for said drive shaft, a clutch shifter adapted to move with said shaft, and controlling means adapted to operate said shifter, including a manual member constructed and arranged to be shifted by the hand of the operator while holding and when moving the work.

5. In starting and stopping mechanism for a machine having a drive shaft, a clutch for said drive shaft, a clutch shifter adapted to move with said shaft, and controlling means adapted to engage said shifter at a definite point in its cycle of movement, including a manual member constructed and arranged to be shifted by the hand of the operator while holding and when moving the work.

6. In starting and stopping mechanism for a machine having a drive shaft, a clutch for said drive shaft, a clutch shifter adapted to move with said shaft, and controlling means adapted to operate said shifter, including a manual member constructed and arranged to be shifted by the hand of the operator while holding and when moving the work adapted to stop said mechanism at a definite point in its cycle of movement.

7. In starting and stopping mechanism for a machine having a drive shaft, a clutch for said drive shaft, a clutch shifter adapted to move with said shaft, and controlling means adapted to operate said shifter, including a manual member constructed and arranged to be shifted by the hand of the operator while holding and when moving the work and connected so as to start the machine when the work is placed in position, and so as to stop the machine when the work is removed.

8. In starting and stopping mechanism for a machine having a drive shaft, a clutch for said drive shaft, a clutch shifter adapted to move with said shaft, and controlling means adapted to engage said shifter at a definite point in its cycle of movement, so constructed and arranged as to start the machine when the work is placed in position, and so as to stop the machine when the work is removed.

9. In starting and stopping mechanism for a machine having a drive shaft, a clutch for said drive shaft, a clutch shifter adapted to move with said shaft, and controlling means adapted to operate said shifter, including a manual member constructed and arranged to be shifted by the hand of the operator while holding and when moving the work adapted to start the machine when the work is placed in position, and to stop the machine at a definite point in its cycle of movement when the work is removed.

In testimony whereof I affix my signature this 30th day of June, 1917.

STEPHEN A. DOBYNE.